(12) United States Patent
Hara et al.

(10) Patent No.: US 11,822,220 B2
(45) Date of Patent: Nov. 21, 2023

(54) PROJECTION CONTROL APPARATUS, TERMINAL APPARATUS, AND PROJECTION METHOD

(71) Applicant: CASIO COMPUTER CO., LTD., Tokyo (JP)

(72) Inventors: Shunsuke Hara, Fuchu (JP); Tetsuro Narikawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/699,951

(22) Filed: Mar. 21, 2022

(65) Prior Publication Data

US 2022/0299849 A1    Sep. 22, 2022

(30) Foreign Application Priority Data

Mar. 22, 2021  (JP) ................................ 2021-046920
Mar. 22, 2021  (JP) ................................ 2021-046923

(51) Int. Cl.
  *G03B 21/14*  (2006.01)
  *G03B 21/20*  (2006.01)
(52) U.S. Cl.
  CPC ....... *G03B 21/147* (2013.01); *G03B 21/2053* (2013.01)
(58) Field of Classification Search
  CPC .... H04N 9/315; H04N 9/3155; H04N 9/3182; H04N 9/3185; H04N 9/3194; G03B 21/142; G03B 21/147; G03B 21/2013; G03B 21/2053; G03B 21/2066
  See application file for complete search history.

(56) References Cited

U.S. PATENT DOCUMENTS

| 2008/0095468 | A1 | 4/2008 | Klemmer et al. |
| 2018/0324396 | A1 | 11/2018 | Ishikawa et al. |
| 2019/0219907 | A1* | 7/2019 | Kurota ................. H04N 9/3185 |

(Continued)

FOREIGN PATENT DOCUMENTS

| JP | 2015186080 A | 10/2015 |
| WO | 2020255766 A1 | 12/2020 |

OTHER PUBLICATIONS

EPO; Application No. 22161622.0; Partial European Search Report dated Aug. 8, 2022.

*Primary Examiner* — Sultan Chowdhury
(74) *Attorney, Agent, or Firm* — Fitch, Even, Tabin & Flannery LLP

(57) ABSTRACT

A projection control apparatus includes at least one processor or a control processing unit, and a communication unit. The control processing unit obtains a first captured image captured at a first point and a second captured image captured at a second point differing from the first point via the communication unit, obtains first correction data from the first captured image and second correction data from the second captured image, obtains first position data at the first position, second position data at the second point, and third position data at a third point differing from the first and second points, determines third correction data corresponding to the third point using the first correction data, the second correction data, the first position data, the second position data, and the third position data, and corrects a projected image to be projected by a projector based on the third correction data.

14 Claims, 10 Drawing Sheets

(56) References Cited

U.S. PATENT DOCUMENTS

| | | | |
|---|---|---|---|
| 2019/0281266 A1* | 9/2019 | Urano | H04N 9/3194 |
| 2019/0392739 A1 | 12/2019 | Kimura et al. | |
| 2020/0007813 A1* | 1/2020 | Ichieda | G03B 17/54 |
| 2021/0136338 A1* | 5/2021 | Kashiwagi | H04N 9/3191 |
| 2021/0356855 A1* | 11/2021 | McIntosh | G03B 21/58 |

* cited by examiner

PROJECTION CONTROL APPARATUS, TERMINAL APPARATUS, AND PROJECTION METHOD

CROSS-REFERENCE TO RELATED APPLICATIONS

This patent application is based upon the benefit of priority under 35 USC 119 from Japanese Patent Application No. 2021-046920 filed on Mar. 22, 2021 and Japanese Patent Application No. 2021-046923 filed on Mar. 22, 2021, the entire disclosures of which, including the specifications, claims, drawings and abstracts, are incorporated herein by reference.

BACKGROUND OF THE INVENTION

Field of the Invention

The present invention relates to a projection control apparatus, a terminal apparatus, and a projection method.

Description of the Related Art

There have conventionally been disclosed projectors including a correcting function to correct an input image through deformation or the like in order to enable the input image to be projected into a clear proper rectangle. For example, Japanese Patent Laid-Open No. 2015-186080 (JP-A-2015-186080) discloses a projector in which a projected adjustment image is imaged, and a correction coefficient is calculated from the image of the adjustment image obtained (the captured image), so that a trapezoidal correction can be executed on the input image using the correction coefficient so calculated.

SUMMARY OF THE INVENTION

According to an aspect of the present invention, there is provided a projection control apparatus including at least one processor and a communication unit, wherein the at least one processor obtains a first captured image which is captured at a first point and a second captured image which is captured at a second point which differs from the first point via the communication unit, obtains first correction data based on the first captured image and obtains second correction data based on the second captured image, obtains first position data at the first position, second position data at the second point, and third position data at a third point which differs from the first point and the second point, determines third correction data corresponding to the third point using the first correction data, the second correction data, the first position data, the second position data, and the third position data, and corrects a projected image which a projection unit is caused to project based on the third correction data so determined.

According to another aspect of the present invention, there is provided a terminal apparatus including an imaging unit and at least one processor, wherein the at least one processor instructs the imaging unit to image a measurement image which is projected by a projector, obtains a correction image which is an image captured as a result of the measurement image being imaged by the imaging unit, and generates instruction data for correcting a projected video image which the projector is caused to project based on the correction image.

According to a further aspect of the present invention, there is provided a projection method including obtaining a first captured image which is captured at a first point and a second captured image which is captured at a second point which differs from the first point via a communication unit, obtaining first correction data based on the first captured image and obtaining second correction data based on the second captured image, obtaining first position data at the first position, second position data at the second point, and third position data at a third point which differs from the first point and the second point, determining third correction data corresponding to the third point using the first correction data, the second correction data, the first position data, the second position data, and the third position data, and correcting a projected image which a projection unit is caused to project based on the third correction data so determined.

DESCRIPTION OF THE EMBODIMENT

Figure 1:
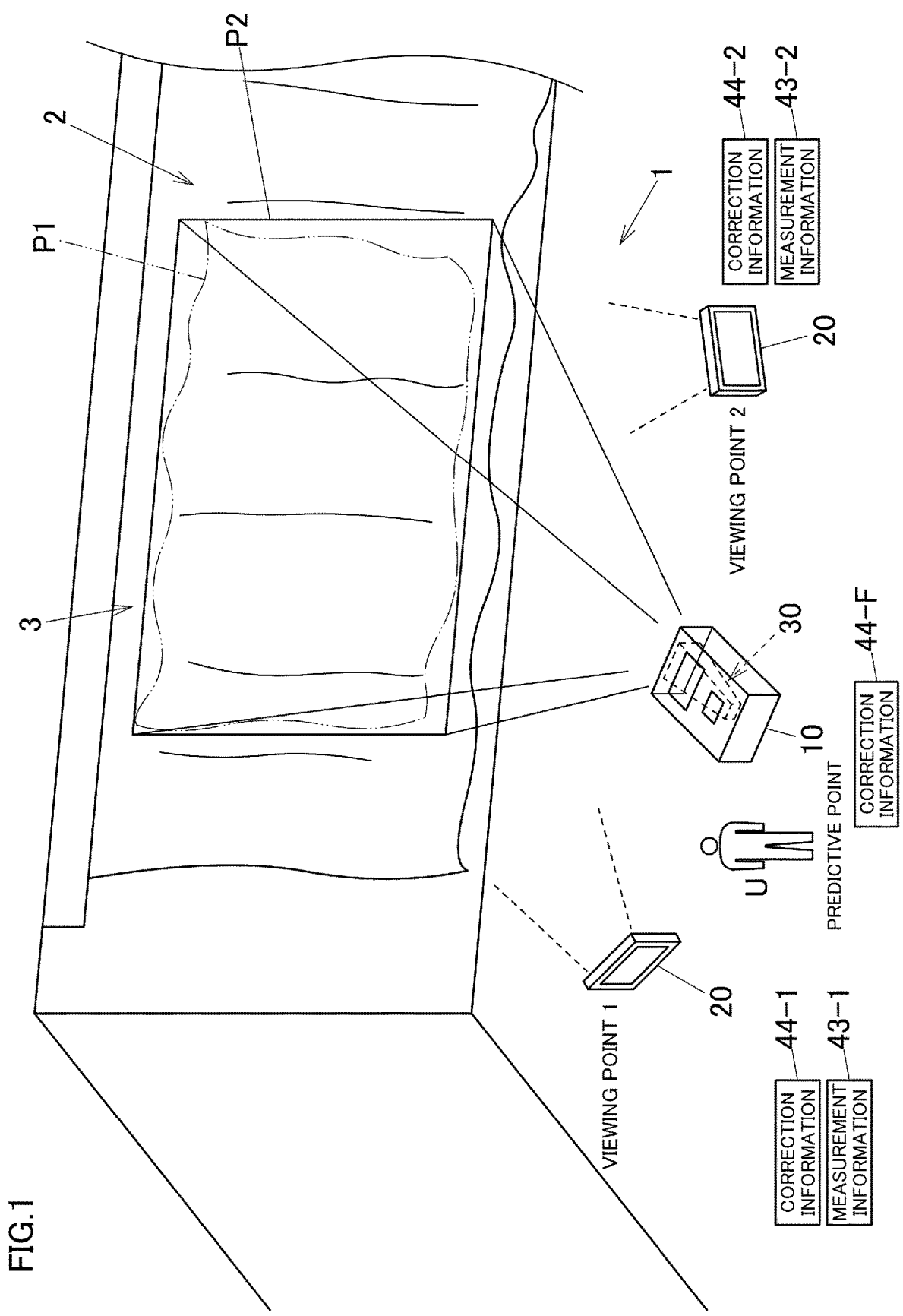
FIG. 1 is a schematic plan view showing a state in which a projected image is being projected on a curtain by a projection system according to an embodiment of the present invention.

Hereinafter, a mode for carrying out the present invention will be described. FIG. 1 is a state in which a projection system 1 according to an embodiment of the present invention, which includes a projector 10 including a projection control apparatus 30 and a mobile terminal 20, is projecting a projected image on a part of a curtain 2 which functions as a projection target surface 3. When an image is projected on the projection target surface 3 (the curtain 2) which undulates irregularly, there is produced a projected image P1 (including a still image and a video image, also referred to as a projected video image) which is distorted as shown by chain double-dashed lines in FIG. 1. With the projection system 1 according to the present embodiment, however, the projected image P1 so distorted is corrected into a rectangular projected image P2 as shown by solid lines in FIG. 1. Then, even when a user U changes his or her viewing position, the projected image is corrected without any delay, so that the user can view the rectangular projected image P2.

Figure 2:
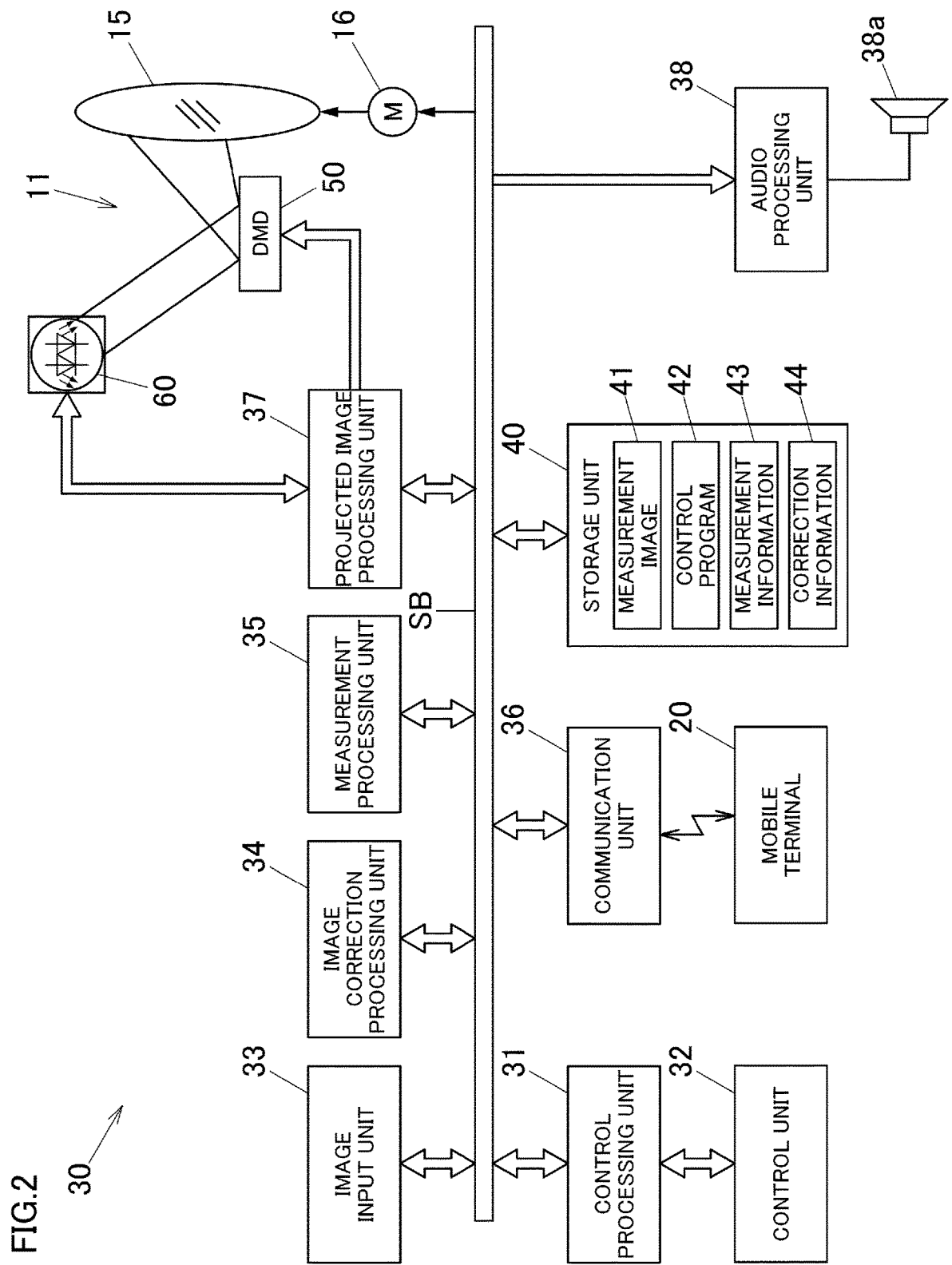
FIG. 2 is a control block diagram showing a projection control apparatus and a projection unit according to the embodiment of the present invention.

FIG. 2 is a control block diagram including the projection control apparatus 30 included in the projector 10. The projection control apparatus 30 includes CPU (or a processor, also referred to as a computer) including a control processing unit 31, an image correction processing unit 34, and a measurement processing unit 35, a front-end unit including an image input unit 33, and a formatter unit including a projected image processing unit 37. Image signals of various standards which are input from the image input unit 33 are transformed so as to be united into an image signal of a predetermined format suitable for display at an image transformation module of the control processing unit 31 by way of a system bus SB, and thereafter, the image correction processing unit 34 and the measurement processing unit 35, which will both be described later, execute predetermined processing on the relevant image signal for output to the projected image processing unit 37.

The projected image processing unit 37 drives a display device 50 to deal with the output image which has been processed at the image correction processing unit 34 and the measurement processing unit 35 and causes a light source apparatus 60 to emit therefrom light of a predetermined wavelength range which is required for image generation. A projection optical system 15 can emit image light generated at the display device 50 as projected light. The projection optical system 15 includes a fixed lens and a movable lens and can be focused using a motor 16. A projection unit 11, which is configured to project image light, includes the projected image processing unit 37, the display device 50, the light source apparatus 60, and the projection optical system 15. The display device 50 can be made up of a digital micromirror device (DMD) which includes a number of microscopic mirrors.

A control unit 32 includes key switches and indicators with which various operations and settings can be performed on the projector 10 (the projection control apparatus 30). Operation signals from the control unit 32 are transmitted to the control processing unit 31.

The control processing unit 31 is connected with an audio processing unit 38 by way of the system bus SB. The audio processing unit 38 includes a circuitry for a sound source such as a pulse code modulation (PCM) sound source or the like. Then, when the projector 10 is in a projection mode or a reproduction mode, the audio processing unit 38 converts audio data into analog data so that voice or sound can be diffused and emitted loudly through a speaker 38a which is driven.

In addition, the projection control apparatus 30 has a storage unit 40. The storage unit 40 is connected with the control processing unit 31, the image correction processing unit 34, and the projected image processing unit 37 by way of the system bus SB. The storage unit 40 is made up, for example, of a solid state driver (SSD) and a static random access memory (SRAM). The storage unit 40 stores a measurement image 41 which is projected for correction, a control program 42 for use in putting the control processing unit 31, the image correction processing unit 34, and the measurement processing unit 35 into function, measurement information 43 which is information on an image (a correction image) captured as a result of the user U imaging the measurement image 41 projected for correction in an arbitrary position, the position, or the like, and correction information 44 which is image correction information corresponding to the position where the user U images the measurement image 41. The measurement information 43 and the correction information 44 will be described in detail later.

A communication unit 36 is, for example, a network interface controller (NIC) and is configured to transmit and receive communication data to and from a communication unit 22 of the mobile terminal 20 by way of a wireless communication path. The communication unit 36 is connected with the control processing unit 31 and the storage unit 40 by way of the system bus SB.

Figure 3:
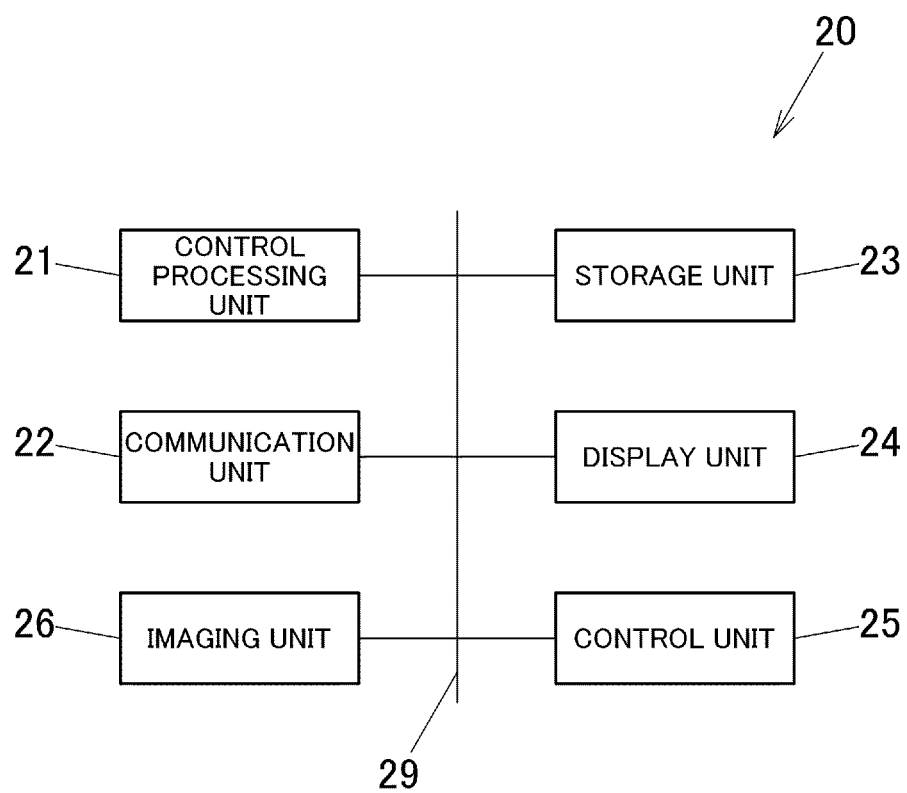
FIG. 3 is a control block diagram of a mobile terminal according to the embodiment of the present invention.

FIG. 3 is a control block diagram of the mobile terminal 20 (a terminal apparatus). Although the mobile terminal 20 is described here as being a smartphone, a tablet personal computer (PC), a note-type personal computer (PC), and the like can also be employed as the mobile terminal 20. The mobile terminal 20 includes a control processing unit 21, a communication unit 22, a storage unit 23, a display unit 24, a control unit 25, and an imaging unit 26, and these constituent units are connected with one another by a bus 29. The control processing unit 21 is a processor for controlling the constituent units. The storage unit 23 is made up of a read only memory (ROM) and a random access memory (RAM). The processor of the control processing unit 21 deploys application programs stored in ROM of the storage unit 23 on RAM for execution.

The communication unit 22 of the mobile terminal 20 is made up, for example, of an antenna and a transmission and reception circuit and is configured to transmit and receive communication data to and from the communication unit 36 of the projection control apparatus 30 via a wireless communication path. The display unit 24 and the control unit 25 can be made up of a touch panel display in which a transparent touch panel, functioning as the control unit 25, is laminated on a surface of a display panel which is made up of a liquid crystal display, an organic electroluminescence (EL) display, or the like, functioning as the display unit 24 and which includes a display function and an input function. The touch panel is of an electrostatic capacity type which senses a position where a finger touches. The user U operates a control screen displayed on the display unit 24 via the control unit 25 so as to control the mobile terminal 20 and the projector 10. Additionally, the mobile terminal 20 has the imaging unit 26 functioning as a camera, whereby an image projected on the projection target surface 3 can be imaged by the imaging unit 26, so that a captured image can be preserved in the storage unit 23.

Here, a projection method is provided for projecting a projected image on the projection target surface 3 while correcting the projected image in such a manner that the user U can view the projected image as a rectangle which would appear when projected on a screen or the like which is free from irregularities even in the case that the user U views the projected image from an arbitrary position (a predictive point, refer to FIG. 1). This projection method generally includes firstly projecting a measurement image 41 (refer to FIG. 2) on the projection target surface 3 using the projection unit 11 of the projector 10, calculating correction information 44 (refer to FIG. 2) by imaging the projected measurement image 41 from a measurement point (a viewing point 1, also referred to as a first point) which lies to the left of the projection target surface 3 as shown in FIG. 1, calculating correction information 44 by imaging similarly the projected measurement image 41 from a measurement point (a viewing point 2, also referred to as a second point) which lies to the right of the projection target surface 3, calculating correction information 44 at a predictive point (that is, a position from which the user U views the projected image, also referred to as a third point) by executing a weighted mean on these pieces of correction information 44 so calculated, and correcting the projected image based on the correction information 44 so calculated using the weighted mean. Here, the second point differs from the first point, and the third poring differs from the first point and the second point.

The pieces of correction information 44 (here, referred to as correction information 44-1 (first correction data) and correction information 44-2 (second correction data)), which are calculated for the viewing point 1 and the viewing point 2, respectively, are correction information 44 for correcting the projection target surface 3 in such a manner that the projection target surface 3 appears to be rectangular when the projection target 3 is viewed from the viewing point 1 and the viewing point 2. Then, to calculate correction information 44 at each viewing point, a known correction method can be used which is performed on the measurement information 43 including the captured image (herein after, referred to simply as a "correction image") obtained by imaging the projected measurement image 41.

Figure 4:
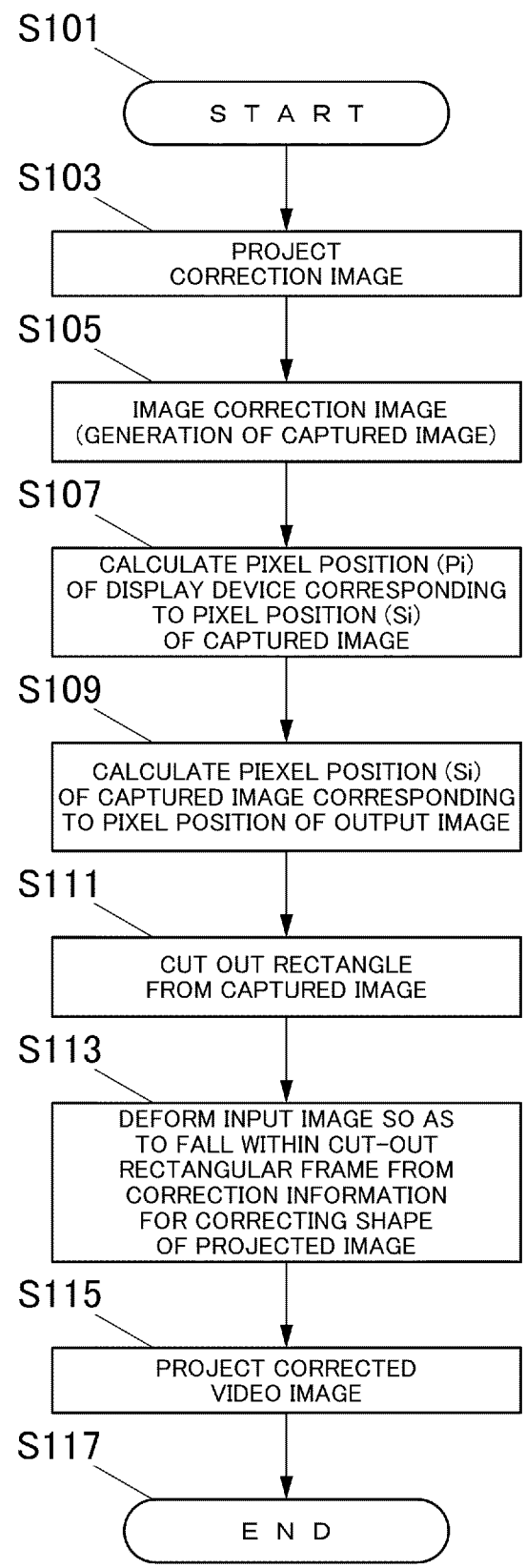
FIG. 4 is a flow chart for calculating correction information at an image correction processing unit according to the embodiment of the present invention.

Hereinafter, an example of a calculation of correction information 44 at each viewing point will be described based on a flow chart shown in FIG. 4. In a process for calculating correction information 44, firstly, in step S103, a measurement image 41, which is to be preserved in the storage unit 40 of the projection control apparatus 30, is projected on the projection target surface 3 by the projection unit 11 of the projection control apparatus 30. Here, for the measurement image 41, an image of a grid-like checkered pattern, a horizontal stripe pattern, a vertical stripe pattern, or the like is used, and there is also a case in which multiple measurement images 41 are used which differ in width of a line making up a grid or stripe pattern.

Next, in step S105, the projected measurement image 41 is imaged, whereby a captured image (a correction image) is generated. In the projection system 1, the projected measurement image 41 is imaged by the imaging unit 26 of the mobile terminal 20, and a captured image (a correction image) is preserved in the storage unit 23 of the mobile terminal 20. The correction image preserved in the storage unit 23 of the mobile terminal 20 is then transmitted from the storage unit 23 of the mobile terminal 20 to the projection control apparatus 30 by way of the communication unit 36 of the projection control apparatus 30 for preservation in the storage unit 40 as measurement information 43.

Figure 5:
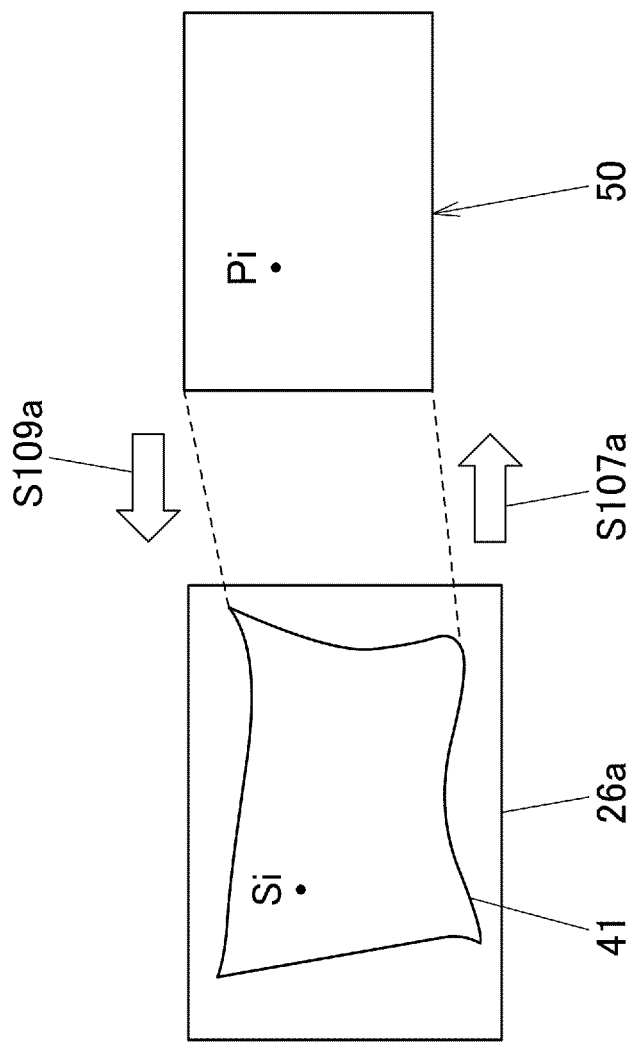
FIG. 5 is a schematic diagram showing a correspondence between a captured image and a display device according to the embodiment of the present invention.

Subsequently, in step S107, the image correction processing unit 34 calculates a pixel position (Pi) of the display device 50 corresponding to a pixel position (Si) of the captured image (the correction image). This is a processing indicated by an arrow S107$a$ in FIG. 5 in which a coordinate Pi of the display device 50, which functions as a digital micromirror device (DMD) which projects the measurement image 41, is obtained for a coordinate Si of the pixel position in the captured image (the correction image) 26$a$ resulting from imaging the projected measurement image 41.

Next, in step S109, the image correction processing unit 34 calculates a pixel position (Si) of the captured image (the correction image) corresponding to a pixel position of an output video image (or an output image, that is, the measurement image 41). This is a processing indicated by an arrow S109$a$ shown in FIG. 5. A correspondence obtained in step S107 is used for calculation of the pixel position (Si) of the captured image (the correction image) which corresponds to the pixel position of the output image. By executing the operations in step S107 and step S109, a positional correspondence between the pixel of the captured image (the correction image) and the output video image is obtained, whereby correction information 44 is calculated. In other words, correction information 44 is calculated using the coordinate Pi of the display device 50 and the coordinate Si of the captured image.

Figure 6:
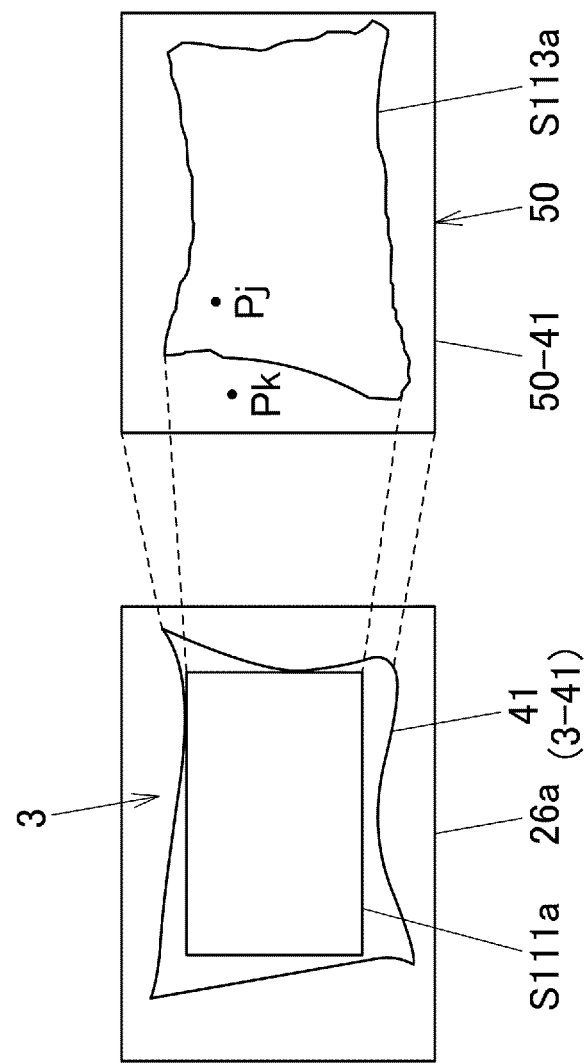
FIG. 6 is a schematic diagram showing a correspondence among a projected image, a deformed projected image, and the display device according to the embodiment of the present invention.

Next, in step S111, a cutout rectangle is determined from the captured image (the correction image). That is, as shown in FIG. 6, in a range defined by the projected image (the measurement image 41 in FIG. 6) which is projected as being deformed, the cutout rectangle constitutes a range where a rectangle S111$a$ of an aspect ratio which corresponds to an aspect ratio of the display device 50 can be projected into a rectangle by the projector 10 (the projection unit 11). The image correction processing unit 34 determines this rectangular range where the rectangle S111$a$ can be projected by the projector 10 (the projection unit 11) from the measurement image 41 in the captured image (the correction image) 26$a$.

Subsequently, in step S113, the image correction processing unit 34 deforms an input video image in such a manner that the input video image falls within the cutoff rectangular frame from the correction information 44 on the shape of the projected image. That is, the image correction processing unit 34 deforms the projected image which the user U views for enjoyment in such a manner that the projected image falls within the rectangle S111$a$ determined in step S111 using the results of the calculations in step S107 and S109 (the correction information 44). The calculation of the correction information 44 is based on the understanding that since a correction image 50-41 of the display device 50 in FIG. 6 is projected as being deformed like a correction image 3-41 on the projection target surface 3, the display device 50 need only project a deformed image S113$a$ in order to project the rectangle S111$a$ on the projection target surface 3.

As a result, a coordinate Pj of the display device 50 after the relative deformation (of the projected image) is calculated for the coordinate of the pixel of the projected image (that is, the coordinate of the display device 50). Further, a coordinate Pk of the display device 50 is calculated which corresponds to the coordinate Pj of the display device 50 after the deformation.

In this way, the image correction processing unit 34 can calculate the correction information 44 which enables the user U to view the clearly defined rectangle on the projection target surface 3 when the user U views the projection target surface from the individual viewing points. This correction information 44 can be calculated for each of the measurement points (the viewing point 1 and the viewing point 2). Correction information 44-1 is calculated at the viewing point 1, and correction information 44-2 is calculated at the viewing point 2.

Then, the measurement processing unit 35 calculates correction information 44-F (third correction data) at the predictive point from the correction information 44 (the correction information 44-1 (first correction data), the correction information 44-2 (second correction data)) at the multiple different viewing points and the position of the predictive point (an arbitrary position from which the user U views the projection target surface 3, third position data) for the positions (first position data, second position data) of the individual measurement points (the viewing point 1, the viewing point 2) by use of a weighted mean. For example, Expression (1) is used for a predictive deformation (a calculation of correction information 44-F at a predictive point 1, also referred to as a predictive correction) in a position where the predictive point 1 internally divides a distance between the viewing point 1 and the viewing point 2 at a ratio of $l_1:l_2$ as shown in FIG. 7.

$$P=(l_1 P_2+l_2 P_1)/(l_1+l_2) \quad (1)$$

Figure 7:
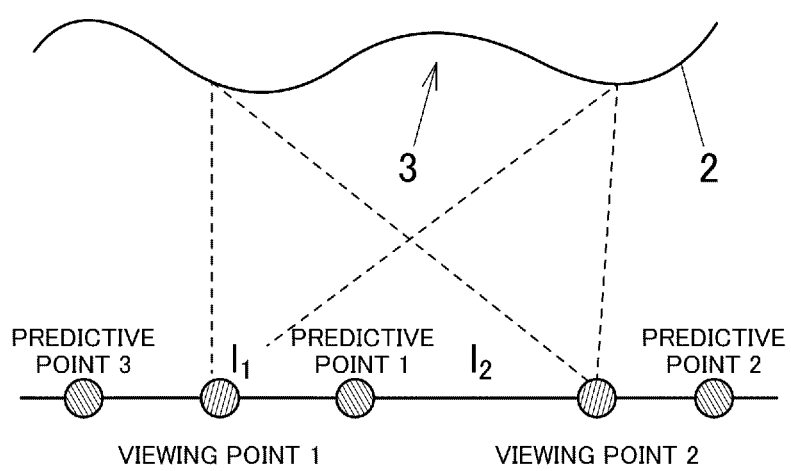
FIG. 7 is a schematic diagram showing a positional relationship between viewing points 1, 2 and predictive points 1, 2, 3 according to the embodiment of the present invention.

Expression (2) is used for a predictive deformation at a predictive point 2 where the predictive point 2 externally divides the distance between the viewing point 1 and the viewing point 2 at the ratio of $l_1:l_2$ as shown in FIG. 7, and Expression (3) is used for a predictive deformation at a predictive point 3.

$$\text{Predictive point 2: } l_1>l_2 \, P=(-l_2 P_1+l_1 P_2)/(l_1-l_2) \quad (2)$$

$$\text{Predictive point 3: } l_1<l_2 \, P=(l_2 P_1-l_1 P_2)/(-l_1+l_2) \quad (3)$$

Here, P, $P_1$, $P_2$ are each any coordinate in the coordinates Si, Pi, Pj, Pk which are used in calculating the correction information 44-1, 44-2. In other words, the weighted mean is executed on the coordinates (Pi, Pj, Pk) of the display device 50 or the coordinate (Si) of the captured image (the correction image) 26a. In short, the weighted mean can be executed on the following four cases:

(A) the coordinate (Si) of the captured image 26a for the coordinate of the display device;
(B) the coordinate (Pi) of the display device 50 for the coordinate (Si) of the captured image 26a;
(C) the coordinate (Pj) of the display device 50 after deformation for the coordinate of the display device 50; and
(D) the coordinate (Pk) of the display device 50 for the coordinate (Pj) of the display device 50 after deformation.

The captured image 26a obtained from each viewing point and the positional information at each viewing point (each measurement point) are preserved in the storage unit 23 as measurement information 43. The positional information at the predictive point and each viewing point can be obtained and determined by any of GPS information output from a GPS reception unit which the mobile terminal 20 includes, angle information for obtaining the captured image 26a which is detected from an acceleration sensor which the mobile terminal 20 includes, or the setting of the user U (user setting).

Thus, the projection method for calculating the correction information 44-F (the third correction data) at the predictive point (the third point) to thereby correct the projected image includes the step of obtaining the first captured image (the correction image) captured at the first point (the viewing point 1) and the second captured image (the correction image) captured at the second point (the viewing point 2) by way of the communication unit 36, the step of obtaining the first correction data (the correction information 44-1) based on the first captured image and obtaining the second correction data (the correction data 44-2) based on the second captured image, the step of obtaining the first position data at the first point, the second position data at the second point, and the third position data at the third point (the predictive point), the step of determining the third correction data (the correction information 44-F) for the third point using the first correction data, the second correction data, and the first to third position data, and the step of correcting the projected image which is to be projected by the projector 10 (the projection unit 11) based on the third correction data so determined.

Then, the third correction data is calculated from the third position data for the first position data and the second position data by executing a weighted mean on the first correction data and the second correction data. Then, the step of obtaining the first correction data based on the first captured image and obtaining the second correction data based on the second captured image includes the step of obtaining the coordinate of the display device for the coordinates of the pixel positions of the first captured image and the second captured image and the step of calculating based on the correspondence so obtained the first correction data and the second correction data using the coordinates of the first captured image and the second captured image which correspond to the pixel position of the output image. In the step of determining the third correction data corresponding to the third point using the first correction data, the second correction data, the first position data, the second position data, and the third position data, the weighted mean is executed on any of (A) to (D) described above.

Figure 8:
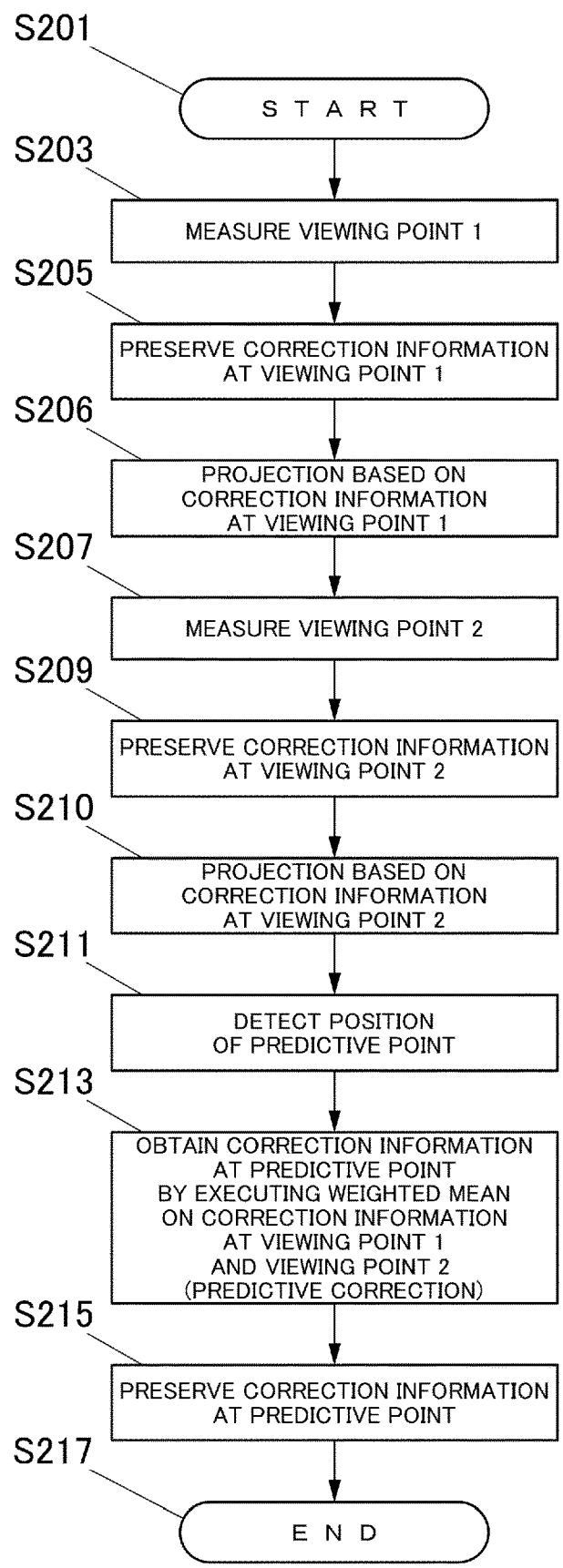
FIG. 8 is a flow chart for calculating correction information at the predictive point according to the embodiment of the present invention.

To describe this specifically, correction information 44-F (predictive correction, third correction data) is calculated by following a flow chart shown in FIG. 8. When starting a predictive correction process, in step S203, the measurement image 41 projected on the projection target surface 3 is imaged at the viewing point 1 by the mobile terminal 20, and measurement information 43-1 (refer to FIG. 1) including the projected image (the correction image) is preserved in the storage unit 40 of the projection control apparatus 30. Subsequently, in step S205, the image correction processing unit 34 calculates correction information 44-1 (first correction data) from the measurement information 43-1 (including the first captured image and the first position data) at the viewing point 1, and the correction information 44-1 so calculated is preserved in the storage unit 40. Then, in step S206, the projection unit 11 projects a corrected video image corresponding to the viewing point 1 based on the correction information (the first correction data) at the viewing point 1.

In steps S207, 209, as with steps S203, S205, a measurement at the viewing point 2 is executed (step S203), and correction information 44-2 (second correction data) (refer to FIG. 1) at the viewing point 2 is calculated from the measurement information 43-2 (including the second captured image and the second position data), and the correction information 44-2 so calculates is preserved in the storage unit 40 (step S209). Then, in step S210, the projection unit 11 projects a corrected video image corresponding to the viewing point 2 based on the correction information (the second correction data) at the viewing point 2. Then, in step S211, positional information (third position data) at the predictive point is calculated, and the positional information so calculated is transmitted to the projection control apparatus 30 for storage in the storage unit 40. Subsequently, in step S213, the measurement processing unit 35 calculates correction information 44-F (third correction data) (a predictive correction) at the predictive point by executing a weighted mean on the correction information 44-1 at the viewing point 1 and the correction information 44-2 at the viewing point 2. In step S215, the measurement processing unit 35 preserves the correction information 44-F at the predictive point which is so calculated in the storage unit 40.

The image correction processing unit 34 deforms the input image using the correction information 44-F at the predictive point which is calculated in the way described above, and the projected image processing unit 37 of the projector 10 controls the light source apparatus 60 and the display device 50 of the projection unit 11 based on the projected image which is deformed to be corrected, whereby projected light of the projected image is projected from the projection optical system 15. Then, even with an image projected on the projection target surface 3 having the irregular plane, the user U can view the projected image of the clearly defined rectangle on the spot even when the user U moves to an arbitrary position.

Figure 9:
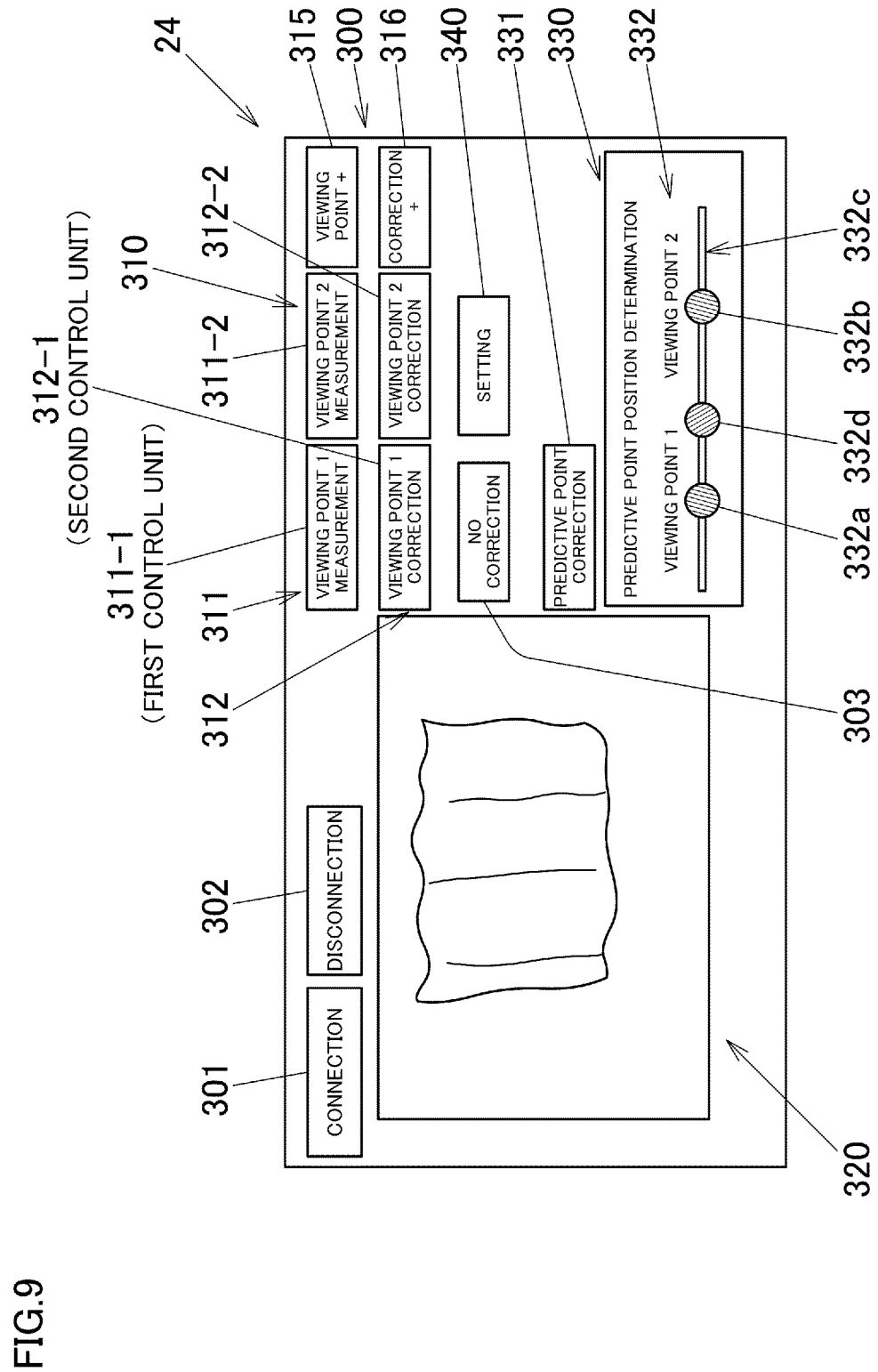
FIG. 9 is a diagram showing a UI screen displayed on a display unit of the mobile terminal according to the embodiment of the present invention.

The operations involved in projecting and imaging of the correction image at each measurement point, setting of the predictive point, and calculation of the correction information can be executed by the mobile terminal 20. FIG. 9 shows an example of a user interface screen 300 (UI screen 300) which is displayed on the display unit 24 (the control unit 25) of the mobile terminal 20. A "connection" button 301 and a "disconnection" button 302 at an upper left corner of the UI screen 300 are buttons for connecting and disconnecting a communication between the communication unit 22 of the mobile terminal 20 and the communication unit 36 of the projector 10 (the projection control apparatus 30).

A camera screen 320 is displayed on a left half part of the UI screen 300. An image captured by the imaging unit 26 of the mobile terminal 20 is displayed on the camera screen 320. A measurement and correction control unit 310 is provided at a top right half part of the US screen 300. The measurement and correction control unit 310 includes a measurement unit 311 including a "viewing point 1 measurement" button 311-1 and a "viewing point 2 measurement" button 311-2 (referred to as a first control unit), a correction unit 312 including a "viewing point 1 correction" button 312-1 and a "viewing point 2 correction" button 312-2 (referred to as a second control unit), a "viewing point+" button 315, and a "correction+" button 316. The control processing unit 21 instructs the imaging unit 26 to image the measurement image projected by the projector 10 in response to an operation of the first control unit to thereby obtain a correction image captured by the imaging unit 26. In addition, the control processing unit 21 generates instruction data for correcting a projected image which the projector 10 (the projection unit 11) is caused to project based on a correction image in response to an operation of the second control unit.

Specifically speaking, for example, when the user U depress the "viewing point 1 measurement" button 311-1 while staying in the position of the viewing point 1, the control processing unit 21 transmits projection instruction information for causing the projection control apparatus 30 to project the measurement image 41 by way of the communication units 22, 36. Then, the measurement image 41 is emitted from the projector 10 to be projected on the projection target surface 3. Then, the imaging unit 26 images the projected measurement image 41, and the resulting captured image is preserved in the storage unit 23. Similarly, when the user U depresses the "viewing point 2 measurement" button 311-2 while staying in the position of the viewing point 2, the measurement image 41 is projected and is imaged by the imaging unit 26, and the resulting captured image is preserved in the storage unit 23.

In addition, for example, when the user U depresses the "viewing point 1 correction" button 312-1, instruction data is generated which causes the projected image which the projector 10 (the projection unit 11) is caused to project to be corrected from the correction image and the positional information of the viewing point 1 which are preserved in the storage unit 23 based on the correction image. Then, the mobile terminal 20 transmits this instruction data to the projector 10, and the projector 10 projects the projected image which is corrected at the viewing point 1.

The "viewing point+" button 315 is displayed at a right side of the measurement unit 311. The "viewing point+" button 315 is a viewing point increase button for increasing further the number of viewing points from the two viewing points (the viewing point 1 and the viewing point 2) (that is, the measurement unit 311). The "correction+" button 316 displayed at a right side of the correction unit 312 is a correction increase button for causing the correction unit 312 to match the number of viewing points which is increased by the "viewing point+" button 315.

A "no correction" button 303, which is displayed at a substantially vertically central portion of the UI screen 300 at a right side of the camera screen 320, is configured as a preview button for previewing a captured image of the projected measurement image 41 which is obtained by the imaging unit 26 of the mobile terminal 20. The "no correction" button 303 enables previewing the projected image before the projected image is imaged by the measurement unit 311 to see whether the projected image falls within the angle of view. In this case, too, an imaged state of the projected measurement image 41 can be confirmed on the camera screen 320.

Figure 10:
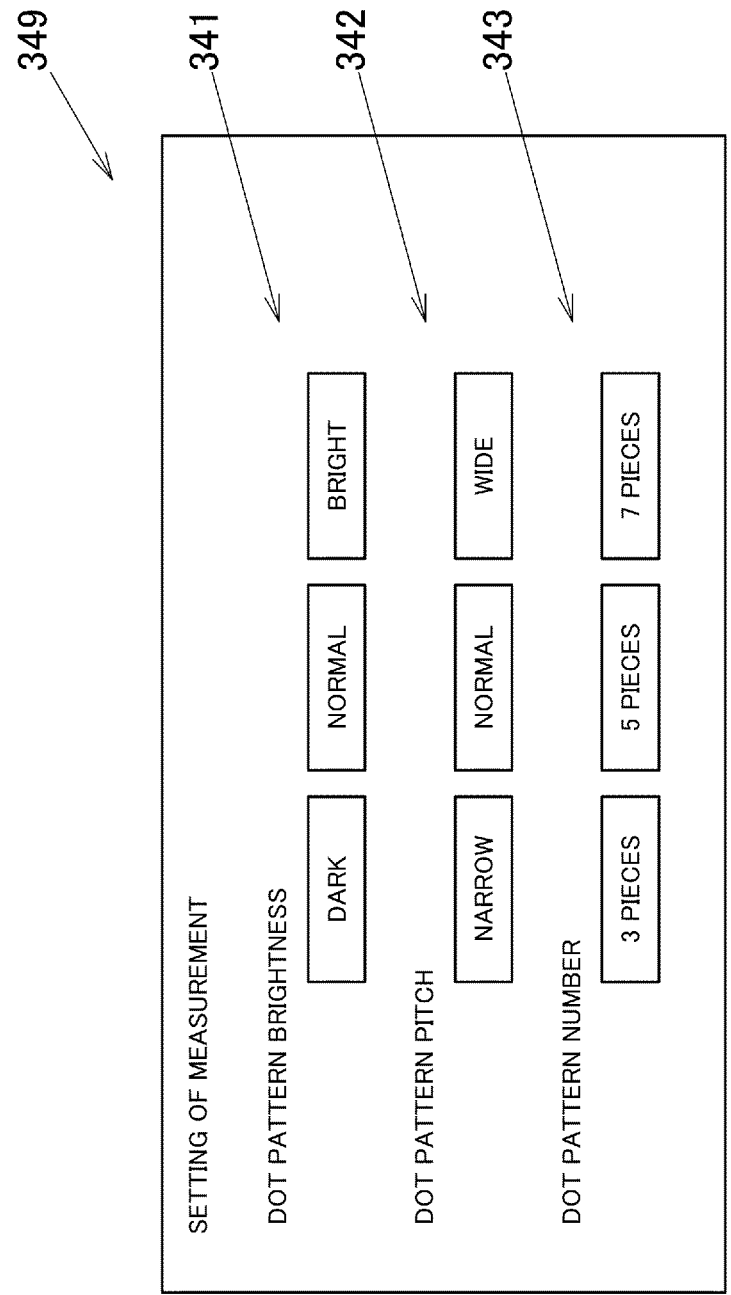
FIG. 10 is a diagram showing a UI screen displayed on the display unit of the mobile terminal according to the embodiment of the present invention.

A "setting" button 340 is displayed at a right side of the "no correction" button 303. With the "setting" button 340, a setting for the measurement image 41 projected by the projector 10 can be executed. When depressing the "setting" button 340, the display unit 24 is switched to a UI screen 349 shown in FIG. 10. With a "dot pattern brightness" section 341 at an upper part of the UI screen 349, the brightness of the measurement image 41 can be adjusted. With a "dot pattern pitch" section 342, the pitch width of the stripe pattern of the measurement image 41, which is made up of the grid-like checkered pattern, the horizontal stripe pattern, or the vertical stripe pattern, can be set. With a "dot pattern number" section 343, the number of pieces (kinds) of measurement image 41 to be projected can be set. These settings can be executed in the case that an error is generated in calculation of measurement information 43 by the measurement unit 311.

A predictive point position determination unit 330 is displayed below the "no correction" button 303 and the "setting" button 340. The predictive point position determination unit 330 can determine a predictive point position for calculating predictive point correction information from multiple pieces of correction information which correspond to operations based individually on multiple combinations of the first control unit and the second control unit which are provided for the different measurement points and the position of the predictive point for the positions of the measurement points by use of a weighted mean. A "predictive point correction" button 331 and a "predictive point position determination slide bar 332 are displayed on the predictive point position determination unit 330. A point 332a indicating the position of the viewing point 1, a point 332b indicating the position of the viewing point 332b, a line 332c connecting the viewing points 1, 2, and a point 332d indicating the predictive point which can be operated to slide and move on the line 332c are shown on the predictive point position determination slide bar 332.

In the case that the user U wants to determine the predictive point (position) by his or her setting, the user U can set his or her setting using the predictive point position determination slide bar 332. The predictive point can be set by moving the point 332d indicating the predictive point along the line 332c. As a result, the predictive point can be set to a position where the measurement points (the viewing points 1, 2) are internally divided or a position where the measurement points (the viewing points 1, 2) are externally divided (the measurement points are externally divided in a position closer to the viewing point 1 or the viewing point 2). The measurement processing unit 35 of the projection control apparatus 30 determines which expression in Expressions (1) to (3) is used for application of the weighted mean based on the predictive point position set by the predictive point position determination slide bar 332. This operation becomes unnecessary in the case that the predictive point is determined based on the GPS information output from the GPS reception unit of the mobile terminal 20 or based on the angle information for imaging the captured image which is detected from the acceleration sensor which the mobile terminal 20 includes.

When depressing the "predictive point correction" button 331 after the predictive point is determined by sliding the point 332d indicating the predictive point, the positional information of the predictive point (the predictive point position), which is set using the predictive point position determination slide bar 332, is transmitted to the projection control apparatus 30. The projection control apparatus 30 causes the measurement processing unit 35 to calculate correction information 44-F at the predictive point so determined using the weighted mean based on the positional information of the predictive point which the projection control apparatus 30 has so received. The projection control apparatus 30 corrects the projected image based on the correction information 44-F at the predictive point. For calculation of the predictive point from GPS or the captured image, the "predictive point correction" button 331 may be turned on and off to indicate that the predictive point position determination slide bar 332 cannot be operated, whereby the measurement processing unit 35 may be caused to calculate correction information 44-F at the predictive point using the weighted mean.

Thus, while the embodiment of the present invention has been described heretofore, the present invention is not limited in any way by the embodiment, and hence, the present invention can be carried out while being modified variously. For example, a configuration may be adopted in which the mobile terminal 20 includes the image correction processing unit 34 and the measurement processing unit 35, so that the mobile terminal 20 can calculate correction information 44 at each viewing point (the viewing points 1, 2) and the predictive point. In this case, the measurement information 43 and the correction information 44 can also be preserved in the storage unit 23 of the mobile terminal 20. In addition, a projecting apparatus can be used for the projector 10, and a personal computer (PC) can be used for the projection control apparatus 30.

While the two measurement points (viewing points) are used in the present embodiment, three or more measurement points can be used, and correction information 44-F at the predictive point can be calculated by executing a weighted mean on pieces of correction information 44 at these multiple measurement points.

According to the embodiment of the present invention that has been described heretofore, the projection control apparatus 30 includes the control processing unit 31, which constitutes at least one processor, and the communication unit 36. The control processing unit 31 obtains the first captured image (the correction image) which is imaged to be captured at the first point (the viewing point 1) and the second captured image (the correction image) which is imaged to be captured at the second point (the viewing point 2) by way of the communication unit 36. Then, the control processing unit 31 obtains the first correction data based on the first captured image and obtains the second correction data based on the second captured image. Subsequently, the control processing unit 31 obtains the first position data at the first point, the second position data at the second point, and the third position data at the third point and determines the third correction data corresponding to the third point using the first correction data, the second correction data, the first position data, the second position data, and the third position data. Then, the control processing unit 31 corrects the projected image which the projector 10 (the projection unit 11) is caused to project based on the third correction data so determined. As a result, even though the user U moves to change the position where the user U views the projected image, the user U can view the corrected projected image on the spot without having to project the correction image and image the projected image to thereby calculate the correction information every time the user U moves to change his or her viewing position.

In addition, the third correction data is calculated from the third position data for the first position data and the second position data by executing a weighted mean on the first correction data and the second correction data. As a result, the correction information 44 at the third position, which is the predictive point, can be calculated accurately.

The correction information 44 (the first correction data, the second correction data) is calculated by obtaining the coordinate of the display device 50 for the coordinates of the pixel positions of the first captured image and the second captured image and using the coordinates of the first captured image and the second captured image which correspond to the pixel position of the output image using the correspondence so calculated. The weighted mean is applied to the coordinate of the display device 50 and the coordinates of the captured images. As a result, the correction information 44 at the predictive point can be calculated using the weighted mean by selecting appropriately the coordinate to be corrected in accordance with the environment in which the projector 10 is disposed.

The position of the predictive point, which is the third position data, is determined by any of GPS, the angle information for imaging to obtain the captured image (the first captured image, the second captured image), and the user setting. As a result, the position of the predictive point can be determined appropriately in accordance with the environment in which the projector 10 is disposed and the user U views the projected image.

The projection control apparatus 30 includes the storage unit 40 for storing the measurement information 43 (the measurement information 43-1, 43-2, and the like), which includes the captured images (the correction images) (the first captured image, the second captured image) which are obtained by imaging the projected image from the measurement points and the positional information at the measurement points (the first to third position data), and the multiple pieces of correction information 44 (the correction information 44-1, 44-2, and the like). As a result, since the correction information 44-F at the predictive point can be calculated based on the information stored in the storage unit 40, the correction information at the predictive point can be calculated without having to execute measurements at the viewing points 1, 2 every time a projected image is projected.

The projection system 1 includes the projection control apparatus 30 including the communication unit 36, the projector 10 having the projection unit 11 in which the display device 50 including the multiple microscopic mirrors is provided, and the mobile terminal 20 configured to obtain the first captured image and the second captured image by imaging the projected image and transmit the first captured image, the second captured image, the first position data, the second position data, and the third position data to the projector 10 by way of the communication unit 36. As a result, the projection system 1 can be provided in which even though the user U moves to change the position where the user U views the projected image, the user U can view the corrected projected image on the spot without having to project the correction image and image the projected image to thereby calculate the correction information every time the user U moves to change his or her viewing position.

The projection method for use by the projection system 1 includes the step of obtaining the first captured image which is imaged to be captured at the first point and the second captured image which is imaged to be captured at the second point by way of the communication unit 36, the step of obtaining the first correction data based on the first captured image and obtaining the second correction data based on the second captured image, the step of obtaining the first position data at the first point, the second position data at the second point, and the third position data at the third point, the step of determining the third correction data corresponding to the third point using the first correction data, the second correction data, the first position data, the second position data, and the third position data, and the step of correcting the projected image which the projector 10 (the projection unit 11) is caused to project based on the third correction data so determined. As a result, the projection method can be provided in which even though the user U moves to change the position where the user U views the projected image, the user U can view the corrected projected image on the spot without having to project the correction image and image the projected image to thereby calculate the correction information every time the user U moves to change his or her viewing position.

The third correction data is calculated from the third position data for the first position data and the second position data by executing a weighted mean on the first correction data and the second correction data. As a result, the correction information 44 at the third point can be generated on the spot through the simple calculation.

In addition, in the projection method, the step of obtaining the first correction data based on the first captured image and obtaining the second correction data based on the second captured image includes the step of obtaining the coordinate of the display device 50 for the coordinates of the pixel position of the first captured image and the second captured image and the step of calculating the first correction data and the second correction data by using the coordinates of the first captured image and the second captured image which correspond to the pixel position of the output image based on the correspondence so obtained. The step of determining the third correction data which corresponds to the third point using the first correction data, the second correction data, the first position data, the second position data, and the third position data applies a weighted mean to any one of (A) the coordinate (Si) of the captured image 26a for the coordinate of the display device, (B) the coordinate (Pi) of the display device 50 for the coordinate (Si) of the captured image 26a, (C) the coordinate (Pj) of the display device 50 after deformation for the coordinate of the display device 50, and (D) the coordinate (Pk) of the display device 50 for the coordinate (Pj) of the display device 50 after deformation. As a result, the correction information 44-F (the third correction data) at the predictive point can be calculated for the display device 50, which is made up of DMD. Then, the weighted mean can be applied using the appropriate coordinate in the (A) to (D) described above.

The projection method can include the step of obtaining the predictive point by any one of GPS, the angle information for obtaining the captured image of the projected image 26a, and the user setting. As a result, the position of the predictive point can be obtained accurately in accordance with the situations.

The program (the control program 42) causes the control processing unit 31 to function so as to obtain the first captured image captured at the first point and obtain the second captured image captured at the second point by way of the communication unit 36, obtain the first correction data based on the first captured image and obtain the second correction data based on the second captured image, obtain the first position data at the first point, the second position data at the second point, and the third position data at the third point, determine the third correction data corresponding to the third point using the first correction data, the second correction data, the first position data, the second position data, and the third position data, and correct the projected image which the projector 10 (the projection unit 11) is caused to project based on the third correction data so determined. As a result, the program can be provided in which even though the user U moves to change the position where the user U views the projected image, the user U can view the corrected projected image on the spot without having to project the correction image and image the projected image to thereby calculate the correction information every time the user U moves to change his or her viewing position.

The third correction data is calculated from the third position data for the first position data and the second position data by executing a weighted mean on the first correction data and the second correction data. As a result, the program described above can be provided in which the execution speed of the program is increased using the simple calculation expressions.

According to the embodiment that has been described heretofore, the mobile terminal 20, which constitutes a terminal apparatus, includes the imaging unit 26 and the control processing unit 21, which constitutes at least one processor. The control processing unit 21 instructs the imaging unit 26 to image the measurement image 41 which is projected by the projector 10 to thereby obtain the correction image which is the image obtained by imaging the correction image using the imaging unit 26 and generates the instruction data for causing the projected video image which the projector 10 is caused to project to be corrected based on the correction image so obtained. As a result, a series of operations from the projection of the measurement image to the correction of the projected image can be executed with good efficiency only by operating the mobile terminal 20.

In addition, the mobile terminal 20 includes the display unit 24, and the first control unit (the "viewing point 1 measurement" button 311-1, the "viewing point 2 measurement" button 311-2) and the second control unit (the "viewing point 1 correction" button 312-1, the "viewing point 2 correction" button 312-2) are displayed adjacent vertically to each other on the display unit 24. The control processing unit 21 issues an instruction instructing the imaging unit 26 to image the measurement image 41 projected by the projector 10 in response to an operation of the first control unit to thereby obtain the correction image which is captured by the imaging unit 26. Alternatively, the control processing unit 21 generates in response to an operation of the second control unit the instruction data for correcting the projected video image which the projector 10 is caused to project based on the correction image so obtained. As a result, the projector 10 can project the image which is corrected at the individual viewing points by the user U operating the mobile terminal 20.

The mobile terminal 20 includes the communication unit 22 for communicating with the projection control apparatus 30. The control processing unit 21 transmits the projection instruction information for causing the projection control apparatus 30, which controls the projection of an image by the projector 10, to project the measurement image 41 before the imaging unit 26 is caused to image the measurement image 41. Alternatively, the control processing unit 21 transmits the correction image to the projection control apparatus 30 after the imaging unit 26 is caused to image the measurement image 41. Alternatively, when the second control unit is operated, the control processing unit 21 transmits the instruction data to the projection control apparatus 30, whereby the projection control apparatus 30 is caused to execute the correction based on the correction information. As a result, the projector 10 can project the image which is corrected at the individual viewing points in an ensured fashion.

The predictive point position determination unit 330 is displayed on the display unit 24, and the predictive point position determination unit 30 determines the predictive point position for calculating the correction information 44-F at the predictive point from the multiple pieces of correction information 44-1, 44-2 which correspond to the operations based individually on the multiple combinations of the first control unit and the second control unit which are provided for the different measurement points and the position of the predictive point for the positions of the measurement points (the viewing points 1, 2) using a weighted mean. As a result, the user U can set the predictive point position. Thus, the setting and detection of the predictive point position does not have to be executed every time the measurement image 41 is projected by setting the predictive point position and preserving it in the storage unit 40 (or the storage unit 23) in advance.

In addition, the predictive point position determination slide bar 332 is displayed on the predictive point position determination unit 330. As a result, since the easily understandable sliding operation is displayed, the user U can easily set the predictive point position.

The preview control unit is displayed on the display unit 24. The preview control unit includes the "no correction" button 303 and enables a preview of the captured image of the projected measurement image 41 which is captured by the imaging unit 26. As a result, the measurement image 41 can be imaged or captured as required.

The projection system 1 has the mobile terminal 20, the projection control apparatus 30, and the projector 10 for projecting a projected image. The projection control apparatus 30 includes the communication unit 36 for communicating with the mobile terminal 20 and the image correction processing unit 34 for obtaining the instruction data from the mobile terminal 20 to thereby calculate the correction information for correcting the projected image. As a result, the projection system 1 for projecting the corrected projected image on the irregular surface can be controlled from the mobile terminal 20.

In addition, the projection control apparatus 30 includes the measurement processing unit 35 for calculating the correction information at the predictive point from the multiple pieces of correction information corresponding to the different measurement points which are calculated in response to operations of the first control unit and the second control unit and the position of the predictive point for the positions of the measurement points using a weighted mean. As a result, the projection system 1 including the terminal apparatus can be provided in which even though the user U moves to change the position from which the user U views the projected image, the information can easily be obtained which is necessary for calculation of the correction information 44 for correcting the projected image.

The application program of the mobile terminal 20 causes the measurement and correction control unit 310 to be displayed on the display unit 24, and this measurement and correction control unit 310 causes the imaging unit 26 to image the projected measurement image 41 and calculates the correction information 44 for correcting the projected image based on the captured measurement image 41. As a result, the mobile terminal 20 including the UI screen 300 can be provided in which with the UI screen 300, the series of operations involved from the projection of the measurement image to the correction of the projected image can be executed with good efficiency and the operations are made simple which are necessary for calculation of the correction information 44 for correcting the projected image.

The embodiment that has been described heretofore is presented as an example, and hence, there is no intention to limit the scope of the present invention by the embodiment. The novel embodiment can be carried out in other various forms, and various omissions, replacements, and modifications can be made thereto without departing from the spirit and scope of the present invention. The embodiment and its variations are included in the spirit and scope of the present invention and are also included in scopes of inventions set forth under claims and their equivalents.

What is claimed is:

1. A projection control apparatus, comprising:
at least one processor; and
a communication unit,
wherein the at least one processor
obtains a first captured image which is captured at a first point and a second captured image which is captured at a second point which differs from the first point via the communication unit,
obtains first correction data based on the first captured image and obtains second correction data based on the second captured image,
obtains first position data at the first position, second position data at the second point, and third position data at a third point which differs from the first point and the second point,
determines third correction data corresponding to the third point using the first correction data, the second correction data, the first position data, the second position data, and the third position data, and
corrects a projected image which a projection unit is caused to project based on the third correction data so determined.

2. The projection control apparatus according to claim 1, wherein the third correction data is calculated from the third position data for the first position data and the second position data by executing a weighted mean on the first correction data and the second correction data.

3. The projection control apparatus according to claim 2, wherein the first correction data and the second correction data are calculated by obtaining a coordinate of a display device for coordinates of pixel positions of the first captured image and the second captured image and using coordinates of the first captured image and the second captured image corresponding to a pixel position of an output image by use of the correspondence so obtained, and wherein the weighted mean is applied to the coordinate of the display device or the coordinates of the first captured image and the second captured image.

4. The projection control apparatus according to claim 1, wherein the third position data is determined by any of a GPS, angle information for capturing the first captured image and the second captured image, and a user setting.

5. The projection control apparatus according to claim 1, comprising further:
a storage unit configured to store the first position data, the second position data, the third position data, the first correction data and the second correction data.

6. A projection method, comprising:
obtaining a first captured image which is captured at a first point and a second captured image which is captured at a second point which differs from the first point via a communication unit;
obtaining first correction data based on the first captured image and obtaining second correction data based on the second captured image;
obtaining first position data at the first position, second position data at the second point, and third position data at a third point which differs from the first point and the second point;
determining third correction data corresponding to the third point using the first correction data, the second correction data, the first position data, the second position data, and the third position data; and
correcting a projected image which a projection unit is caused to project based on the third correction data so determined.

7. The projection method according to claim 6, wherein the third correction data is calculated from the third position data for the first position data and the second position data by executing a weighted mean on the first correction data and the second correction data.

8. The projection method according to claim 7, wherein obtaining the first correction data based on the first captured image and obtaining the second correction data based on the second captured image comprises calculating the first correction data and the second correction data by obtaining a coordinate of a display device for coordinates of pixel positions of the first captured image and the second captured image and using coordinates of the first captured image and the second captured image corresponding to a pixel position of an output image by use of the correspondence so obtained, and wherein determining the third correction data corresponding to the third point using the first correction data, the second correction data, the first position data, the second position data, and the third position data comprises applying the weighted mean to any one of the coordinates of the first captured image and the second captured image for the coordinate of the display device, the coordinate of the display device for the coordinates of the first captured image and the second captured image, a coordinate of the display device after deformation for the coordinate of the display device, and the coordinate of the display device for the coordinate of the display device after deformation.

9. The projection method according to claim 6, comprising:
obtaining positional information of the third position data by any one of a GPS, angle information for capturing the first captured image and the second captured image, and a user setting.

10. A terminal apparatus, comprising:
an imaging unit;
at least one processor,
wherein the at least one processor
instructs the imaging unit to image a measurement image which is projected by a projector,
obtains a correction image which is an image captured as a result of the measurement image being imaged by the imaging unit, and
generates instruction data for correcting a projected video image which the projector is caused to project based on the correction image; and
a display unit, a first control unit and a second control unit being displayed in an aligned fashion on the display unit,
wherein the processor issues an instruction instructing the imaging unit to image the measurement image projected by the projector in response to an operation of the first control unit and obtains the correction image which is imaged by the imaging unit, and
wherein the processor generates the instruction data for correcting the projected video image which the projector is caused to project based on the correction image in response to an operation of the second control unit.

11. The terminal apparatus according to claim 10, comprising:
a communication unit configured to communicate with a projection control apparatus,
wherein the processor transmits projection instruction information for causing the measurement image to be projected to the projection control apparatus configured to control a projection of an image by the projector before causing the imaging unit to image the measurement image,
wherein the processor transmits the correction image to the projection control apparatus after having caused the imaging unit to image the measurement image, and
wherein when the second control unit is operated, the processor transmits the instruction data to the projection control apparatus to thereby cause the projection control apparatus to execute a correction based on correction information.

12. The terminal apparatus according to claim 11, wherein a predictive point position determination unit is displayed on the display unit, the predictive point position determination unit being configured to determine a position of a predictive point for calculating the correction information at the predictive point from multiple pieces of the correction information which correspond to operations based individually on multiple combinations of the first control unit and the second control unit which are provided for different measurement points and the position of the predictive point for positions of the measurement points by use of a weighted mean.

13. The terminal apparatus according to claim 12, wherein a predictive point position determination slide bar which is displayed on the predictive point position determination unit in such a manner as to be operated slidably.

14. The terminal apparatus according to claim 10, wherein a preview control unit is displayed on the display unit, the preview control unit being configured to enable a preview of a captured image of the projected correction image which is captured by the imaging unit.

\* \* \* \* \*

UNITED STATES PATENT AND TRADEMARK OFFICE
CERTIFICATE OF CORRECTION

PATENT NO. : 11,822,220 B2
APPLICATION NO. : 17/699951
DATED : November 21, 2023
INVENTOR(S) : Hara et al.

It is certified that error appears in the above-identified patent and that said Letters Patent is hereby corrected as shown below:

In the Claims

In Column 17, Claim 5, Line 13, delete "comprising further:" and insert -- further comprising: --, therefor.

Signed and Sealed this
Twenty-third Day of April, 2024

Katherine Kelly Vidal
*Director of the United States Patent and Trademark Office*